United States Patent
Mitani et al.

(10) Patent No.: US 9,363,434 B2
(45) Date of Patent: Jun. 7, 2016

(54) LENS BARREL AND LENS UNIT

(71) Applicant: Konica Minolta, Inc., Tokyo (JP)

(72) Inventors: Yoshifumi Mitani, Osaka (JP); Yutaka Tsujimoto, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/551,572

(22) Filed: Nov. 24, 2014

(65) Prior Publication Data

US 2015/0146035 A1 May 28, 2015

(30) Foreign Application Priority Data

Nov. 25, 2013  (JP) ................ 2013-242643

(51) Int. Cl.
| | |
|---|---|
| H04N 5/232 | (2006.01) |
| G02B 7/105 | (2006.01) |
| G02B 7/09 | (2006.01) |
| G03B 13/32 | (2006.01) |
| G03B 13/36 | (2006.01) |
| G03B 13/34 | (2006.01) |

(52) U.S. Cl.
CPC ............ H04N 5/23229 (2013.01); G02B 7/105 (2013.01)

(58) Field of Classification Search
CPC ........ H04N 5/23229; G02B 7/09; G02B 7/00; G02B 7/04; G02B 7/105; G03B 3/00; G03B 13/32; G03B 13/34; G03B 13/36

USPC .......... 348/360, 335, 357, 345; 359/823, 824, 359/699, 701, 696, 825, 694, 700, 703, 704, 359/826, 830; 396/72–152, 529
See application file for complete search history.

(56) References Cited

U.S. PATENT DOCUMENTS

| | | | | |
|---|---|---|---|---|
| 6,072,639 A * | 6/2000 | Onda | ..................... | G02B 7/102 359/694 |
| 7,719,775 B2 * | 5/2010 | Kudoh | ................... | G02B 7/102 359/694 |
| 2003/0081329 A1 * | 5/2003 | Nomura | ................. | G02B 7/102 359/700 |
| 2009/0097141 A1 * | 4/2009 | Iwasa | ..................... | G03B 17/14 359/824 |
| 2010/0172032 A1 * | 7/2010 | Fukino | ..................... | G02B 7/10 359/700 |
| 2010/0214670 A1 * | 8/2010 | Matsumoto | ............ | G02B 7/102 359/699 |

FOREIGN PATENT DOCUMENTS

JP  2012-027060 A  2/2012

* cited by examiner

*Primary Examiner* — Tuan Ho
*Assistant Examiner* — Marly Camargo
(74) *Attorney, Agent, or Firm* — Osha Liang LLP

(57) ABSTRACT

A lens barrel includes: a motor; an input transmission ring that is rotated by the motor and is rotatable around the optical axis; and a lens drive cylinder connected to the input transmission ring so that rotating force can be transmitted from the input transmission ring, the lens drive cylinder moving a lens in the optical axis direction and being rotatable. The lens drive cylinder is placed on one side of the motor in the optical axis direction, and the input transmission ring is placed on the same side of the motor as the lens drive cylinder.

10 Claims, 8 Drawing Sheets

LENS BARREL AND LENS UNIT

The entire disclosure of Japanese Patent Application No. 2013-242643 filed on Nov. 25, 2013 including description, claims, drawings, and abstract are incorporated herein by reference in its entirety.

BACKGROUND OF THE INVENTION

1. Field of the Invention

The present invention relates to a lens barrel and a lens unit.

2. Description of the Related Art

A conventionally known lens barrel includes: a rotatable lens drive cylinder that moves and operates a lens in the optical axis direction; a rotatable input transmission ring that is connected to the lens drive cylinder in such a manner that rotating force can be transmitted; and a motor that rotationally drives the input transmission ring. For example, JP 2012-27060 A discloses such a lens barrel.

In the lens barrel disclosed in JP 2012-27060 A, the lens drive cylinder is placed on one side of the motor in the optical axis direction, and the input transmission ring is placed on the other side of the motor in the optical axis direction. The lens drive cylinder and the input transmission ring are connected by two connecting levers in such a manner that rotating force can be transmitted.

In JP 2012-27060 A, however, the lens drive cylinder and the input transmission ring that are placed on both sides of the motor in the optical axis direction are connected by two connecting levers. Therefore, the connecting levers should be placed on the outer side of the motor in the radial direction, for example, so that the two connecting levers will not be brought into contact with the motor. Where the connecting levers are placed on the outer side of the motor in the radial direction, the entire lens barrel is large in radius. The connecting levers can be placed on the circumferential-direction side of the motor so that the two connecting levers will not be brought into contact with the motor. However, where the connecting levers are placed on the circumferential side of the motor, the rotation ranges of the connecting levers in the circumferential direction are limited, resulting in a smaller number of rotations of the lens drive cylinder.

In addition, since the lens drive cylinder and the input transmission ring are connected by two connecting levers, the two connecting levers need to simultaneously transmit the rotating force of the rotating input transmission ring to the lens drive cylinder. Therefore, the two connecting levers should be attached to the lens drive cylinder and the input transmission ring with high precision.

SUMMARY OF THE INVENTION

It is an object of the present invention to provide a lens barrel and a lens unit that can connect a lens drive cylinder and an input transmission ring in such a manner that rotating force can be transmitted without the use of a connecting lever.

To achieve at least one of the abovementioned objects, according to an aspect, a lens barrel reflecting one aspect of the present invention comprises: a motor; a rotatable input transmission ring that is rotated by the motor; and a rotatable lens drive cylinder that is connected to the input transmission ring so that rotating force is transmitted from the input transmission ring, and moves a lens in the optical axis direction. The lens drive cylinder is placed on one side of the motor in the optical axis direction, and the input transmission ring is placed on the same side of the motor as the lens drive cylinder.

In this structure, the input transmission ring is placed on the same side of the motor as the lens drive cylinder in the optical axis direction, and the input transmission ring and the lens drive cylinder can be connected directly to each other. Accordingly, the lens drive cylinder and the input transmission ring can be connected in such a manner that rotating force can be transmitted, without the use of a connecting lever that has been used in conventional structures.

According to another aspect, the lens barrel preferably further includes: an automatic input ring that is rotated by the motor and is rotatable around the optical axis; and at least three interlocking members that interlock the input transmission ring with the automatic input ring. Each of the interlocking members preferably includes a roller shaft held by the input transmission ring, and a rotating roller rotatably supported by the roller shaft. The rotating roller preferably rotates the automatic input ring as the automatic input ring rotates, and the input transmission ring preferably rotates around the optical axis as the rotating roller rotates.

In this structure, the input transmission ring receives the rotating force from the motor via the automatic input ring and the interlocking members, and is readily and certainly driven.

According to yet another aspect, the lens barrel preferably further includes an electric component that controls the motor. The input transmission ring and the lens drive cylinder are preferably placed on one side of the electric component in the optical axis direction, and part or all of the motor is preferably placed on a circumferential-direction side of the electric component.

As the input transmission ring and the lens drive cylinder are placed on one side in the optical axis direction with respect to the electric component in this structure, the input transmission ring and the lens drive cylinder can be connected, without interfering with the electric component.

As part or all of the motor is placed on the circumferential-direction side of the electric component, the length of the lens barrel in the optical axis direction can be reduced, and the lens barrel can be made smaller in size.

According to still another aspect, the lens barrel preferably further includes a fixed cylinder. The lens drive cylinder is preferably placed on the outer circumferential side or the inner circumferential side of the fixed cylinder, and part or all of the input transmission ring is preferably placed on the outer circumferential side of the lens drive cylinder.

With this structure, the length of the lens barrel in the radial direction can be reduced, and the lens barrel can be made smaller in size.

According to yet another aspect, one of the lens drive cylinder and the input transmission ring preferably has at least one engaging convex portion, and the other one of the lens drive cylinder and the input transmission ring preferably has at least one engaging concave portion engaged with the at least one engaging convex portion in such a manner as to be unable to move in the circumferential direction.

In this structure, the input transmission ring and the lens drive cylinder are certainly connected by the engaging convex portions and the engaging concave portions in such a manner that rotating force can be transmitted. In addition, the input transmission ring and the lens drive cylinder can be readily connected in such a manner that rotating force can be transmitted.

According to still another aspect, the at least one engaging convex portion preferably includes two engaging convex portions arranged at substantially regular intervals in the circumferential direction of the one of the lens drive cylinder and the input transmission ring, and the at least one engaging concave portion preferably includes two engaging concave portions placed in the positions corresponding to the engaging convex portions in the other one of the lens drive cylinder and the input transmission ring.

In this structure, rotating force is efficiently transmitted from the input transmission ring to the lens drive cylinder.

According to yet another aspect, the at least one engaging convex portion and the at least one engaging concave portion are preferably engaged with each other in such a manner as to be able to move in the optical axis direction.

In this structure, the input transmission ring is not restricted in the optical axis direction, can operate without decrease in input transmission efficiency, and can smoothly rotate.

To achieve at least one of the abovementioned objects, according to an aspect, a lens unit reflecting one aspect of the present invention comprises: one of the above described the lens barrels; and an imaging device that converts an optical image of an object into an electrical signal, and has a light receiving surface in the imaging position of the lens barrel.

In this structure, the input transmission ring and the lens drive cylinder can be connected directly to each other, and a lens unit that can connect the lens drive cylinder and the input transmission ring in such a manner that rotating force can be transmitted without the use of a connecting lever that has been used in conventional structures.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Figure 1:
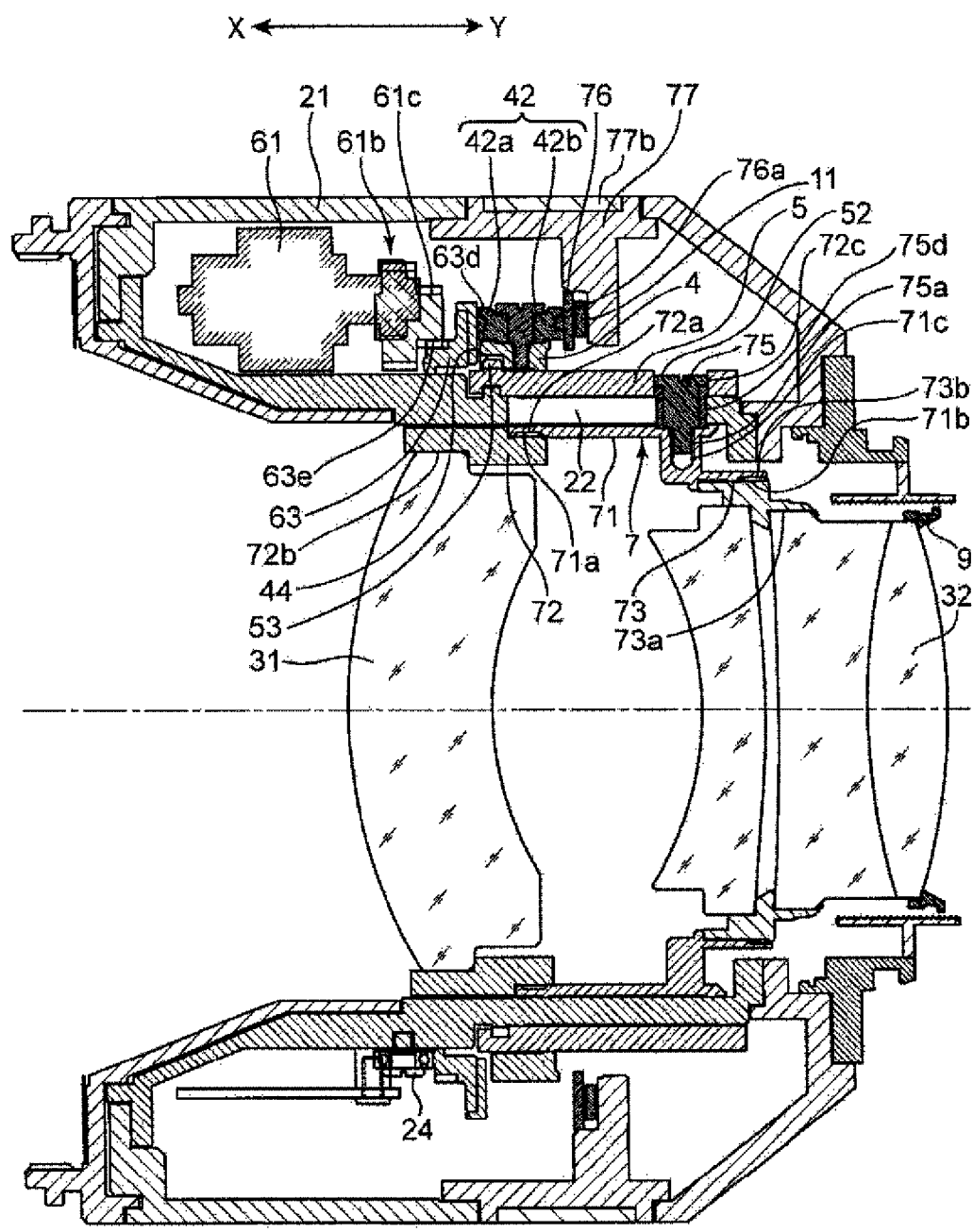
FIG. 1 is a cross-sectional view of a lens barrel according to an embodiment of the present invention.
Figure 2:
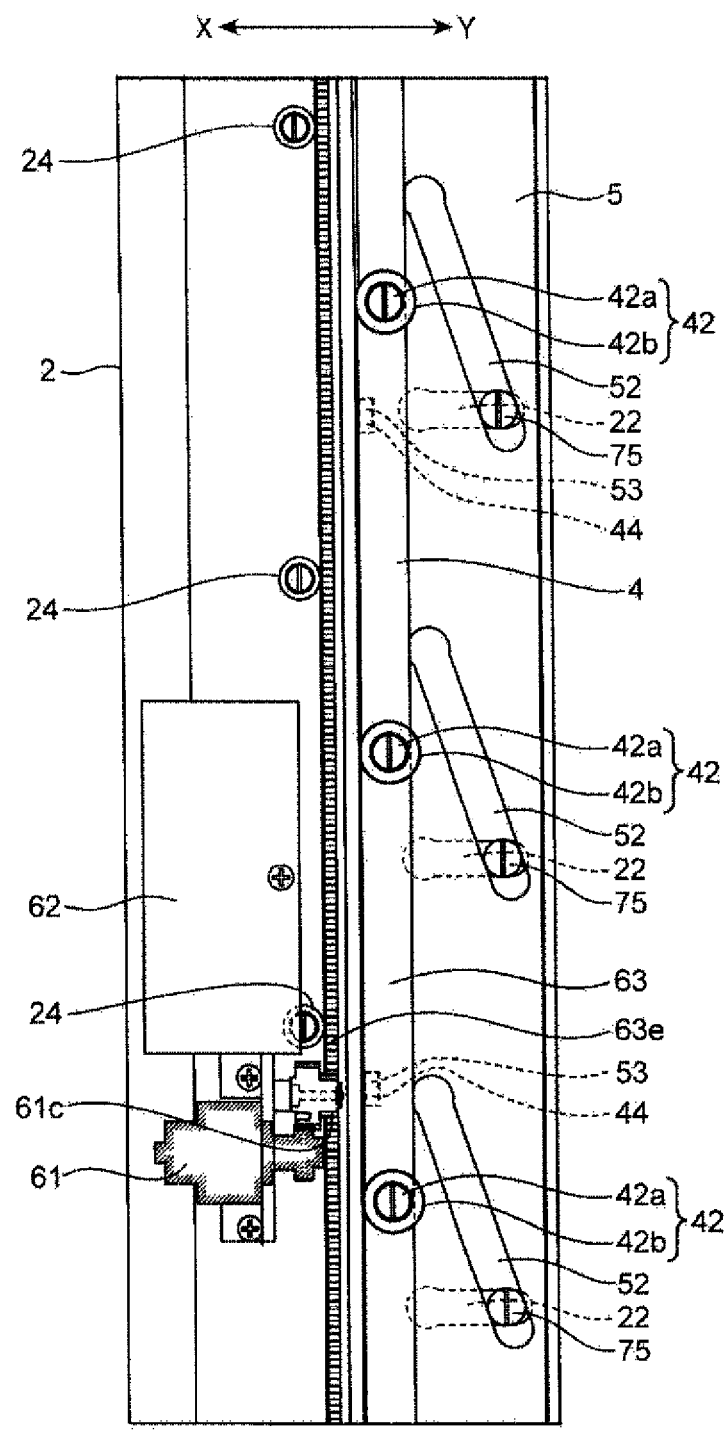
FIG. 2 is a development side view of a fixed cylinder, an automatic input ring, and a lens drive cylinder that are used in the lens barrel of FIG. 1 in an assembled state.
Figure 3:
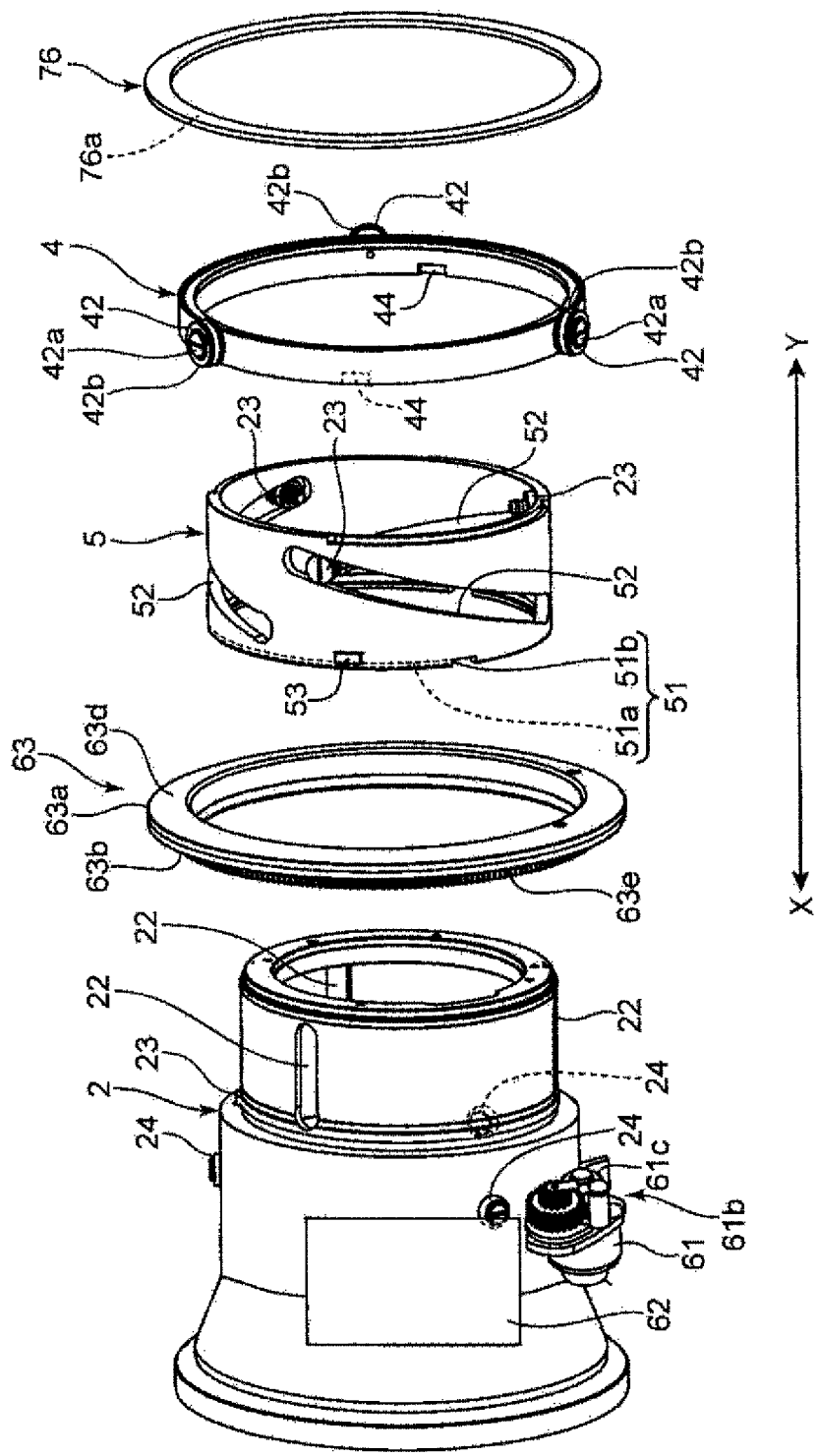
FIG. 3 is an exploded perspective view of the fixed cylinder, the lens drive cylinder, an input transmission ring, a manual input ring, and the automatic input ring that are used in the lens barrel of FIG. 1.

The following is a detailed description of embodiments for carrying out the present invention, with reference to the accompanying drawings. FIG. 1 is a cross-sectional view of a lens barrel according to an embodiment of the present invention. FIG. 2 is a development side view of a fixed cylinder, an automatic input ring, and a lens drive cylinder that are used in the lens barrel of FIG. 1 in an assembled state. FIG. 3 is an exploded perspective view of the fixed cylinder, the lens drive cylinder, an input transmission ring, a manual input ring, and an automatic input ring that are used in the lens barrel of FIG. 1. In the description below, the X-Y direction in FIGS. 1 to 7 is the depth direction (the optical axis direction), the X-direction is the direction toward the front side (the objective side), and the Y-direction is the direction toward the back side (the image side).

As shown in FIG. 1, the lens barrel 1 of this embodiment includes a fixed cylinder 2 having a cylindrical shape, an automatic focus operation unit, a manual focus operation unit, an input transmission ring 4, a lens drive cylinder 5, a lens holding member 7, and lens groups 31 and 32.

Figure 4:
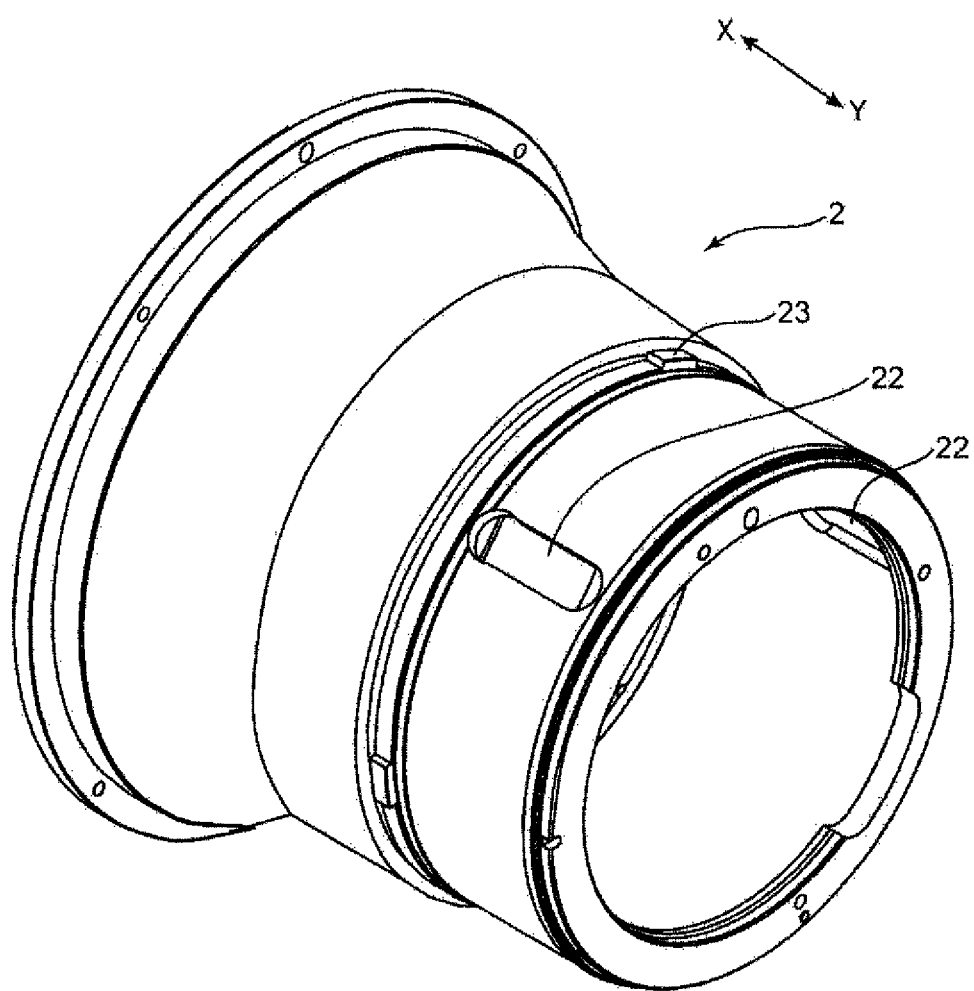
FIG. 4 is a perspective view of the fixed cylinder used in the lens barrel of FIG. 1.

As shown in FIGS. 3 and 4, the fixed cylinder 2 includes, on its rear side, three straight guide grooves 22 that extend in an axial direction (an optical axis direction), and a bayonet engaging convex portion 23 for bayonet-engaging with the lens drive cylinder 5. The straight guide grooves 22 are for guiding the lens groups 31 and 32 in the optical axis direction, and are provided at regular intervals in a circumferential direction.

On the outer circumferential side of the fixed cylinder 2, a cylindrical cover 21 is provided as shown in FIG. 1, and the outer circumference of the fixed cylinder 2 is covered with the cover 21.

The automatic focus operation unit includes a motor 61, a control unit 62, and an automatic input ring 63, as shown in FIG. 3. In this embodiment, the motor 61 includes a rotating shaft (not shown) and a reduction gear 61b connected to the rotating shaft. The reduction gear 61b includes an output gear 61c.

The motor 61 is attached to the fixed cylinder 2 in such a manner that the rotating shaft extends parallel to the optical axis outside the fixed cylinder 2, and the output gear 61c faces the rear side.

The motor 61 may be a stepping motor, a DC motor, a stick-like ultrasonic motor, or the like, and be appropriately modified at a time of use. The motor 61 does not necessarily include the reduction gear 61b, but may be modified as appropriate. For example, any reduction gear may not be included, and the output gear 61c may be connected directly to the rotating shaft.

The control unit 62 is connected to the motor 61 in a conductible manner, for example, and controls the motor 61 and the like. The control unit 62 is placed on the circumferential-direction side of the motor 61 on the outer circumferential side of the fixed cylinder 2 so as to be adjacent to the motor 61 in the circumferential direction, and is attached to the fixed cylinder 2. In FIG. 2, only the substrate of the control unit 62 is shown, and the electronic components mounted on the substrate are not shown.

As described above, the motor 61 and the control unit 62 are placed in the vicinity of each other, and are adjacent to each other in the circumferential direction of the fixed cylinder 2. Accordingly, electrical connection between the motor 61 and the control unit 62 can be readily established, and the motor 61 and the control unit 62 are made shorter in the axial direction of the fixed cylinder 2 so that the fixed cylinder 2 can become shorter in the axial direction.

Figure 6:
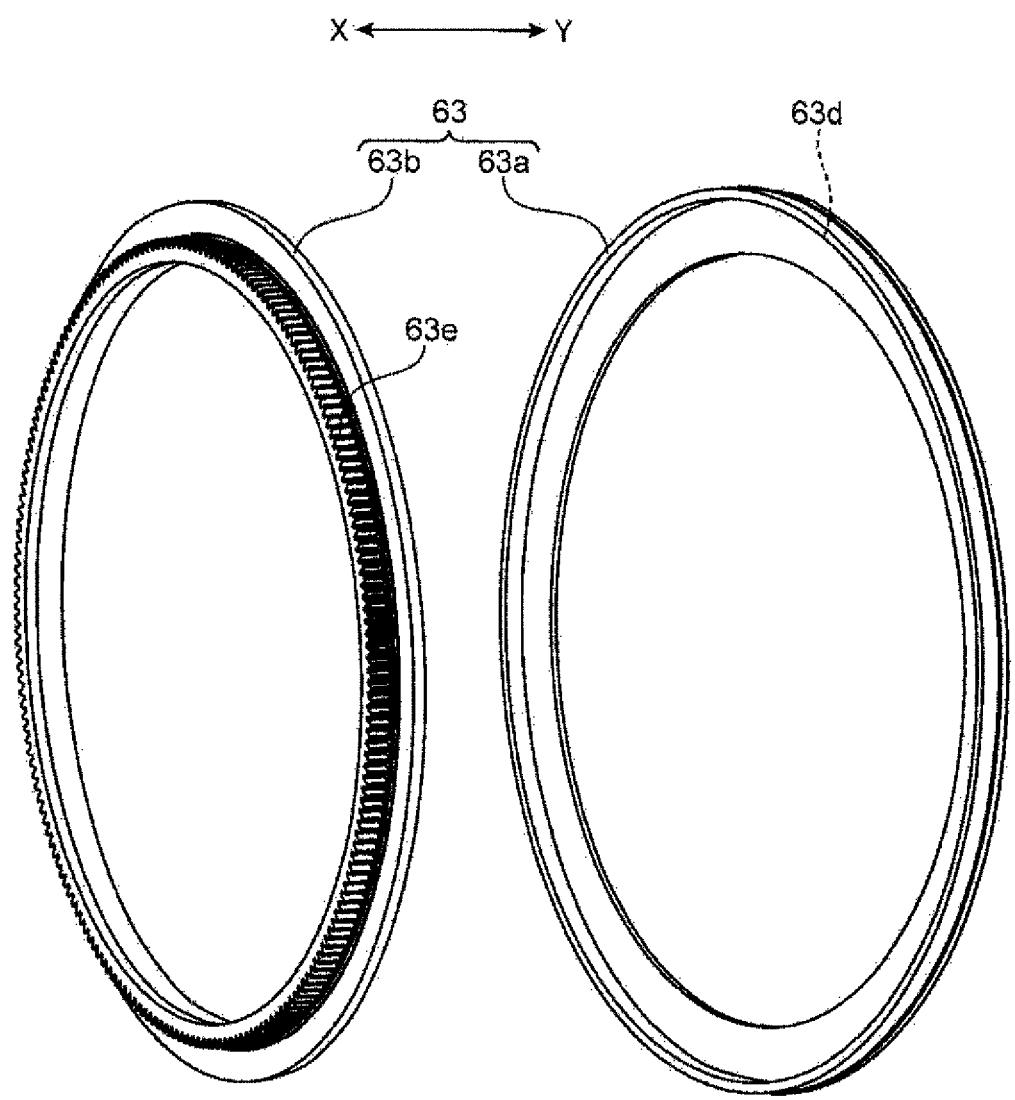
FIG. 6 is an exploded perspective view of the automatic input ring used in the lens barrel of FIG. 1.

The automatic input ring 63 is formed with ring-like components. In this embodiment, the automatic input ring 63 is formed with a main ring 63a and a gear ring 63b, as shown in FIG. 6. The main ring 63a has, on its rear surface, a second roller rotating portion 63d around which a rotating roller 42b described later rotates.

The gear ring 63b has, along its entire outer circumference, a first gear 63e to be meshed with the output gear 61c of the motor 61. As shown in FIG. 1, this gear ring 63b is secured to the front side of the main ring 63a.

The automatic input ring 63 having the above described structure is placed on the rear side of the motor 61 on the outer circumference of the fixed cylinder 2 so as to be in contact with the rear sides of bearings 24 formed in the fixed cylinder 2 and be able to rotate around the axis of the fixed cylinder 2.

In this arrangement, the first gear 63e of the automatic input ring 63 is meshed with the output gear 61c of the motor 61, so that the automatic input ring 63 revolves around the outer circumference of the fixed cylinder 2 as the output gear 61c rotates.

Although the automatic input ring 63 is formed with the main ring 63a and the gear ring 63b independent of the main ring 63a, the main ring 63a and the gear ring 63b may be integrally formed with each other or be modified as appropriate.

As shown in FIG. 1, the manual focus operation unit includes a manual input ring 76 and a manual operation ring 77 serving as a manual drive operation member that operates the manual input ring 76.

The manual input ring 76 is formed with a disk-like component as shown in FIG. 3, and has, on its front surface, a first roller rotating portion 76a around which a rotating roller 42b described later rotates.

As shown in FIG. 1, this manual input ring 76 is placed on the rear side of the automatic input ring 63 in the axial direction of the fixed cylinder 2 so as to be able to rotate around the axis of the fixed cylinder 2.

As shown in FIG. 1, the manual operation ring 77 is formed with a cylindrical component, has a rotating operation portion 77b on its outer circumferential side, and has, on its inner circumferential side, an input ring holding portion 77a that protrudes toward the inside in a radial direction.

The input ring holding portion 77a is formed with a disk-like component, and handles the manual input ring 76 from the rear side via a pushing member 11 that will be described later.

The manual operation ring 77 is placed on the outer circumferential side of the fixed cylinder 2 so as to be able to rotate around the axis of the fixed cylinder 2. In this arrangement, the input ring holding portion 77a is placed on the rear side of the automatic input ring 63 so as to face the second roller rotating portion 63d.

Next, the input transmission ring 4 is described. As shown in FIG. 3, the input transmission ring 4 is formed with a ring-like component, and has lens drive cylinder engaging concave portions (engaging concave portions) 44 on its front side.

In this embodiment, two lens drive cylinder engaging concave portions 44 are provided at regular intervals in the circumferential direction of the input transmission ring 4, and each of the lens drive cylinder engaging concave portions (engaging concave portions) 44 is formed in the inner circumferential surface of the input transmission ring 4, and has a predetermined depth from the front end surface.

The number of the lens drive cylinder engaging concave portions 44 is not limited to two, but may be one or larger than two. In a case where the number of the lens drive cylinder engaging concave portions 44 is two or more, the concave portions 44 are preferably formed at regular intervals in the circumferential direction, but may not necessarily be arranged at regular intervals.

Also, at least three (three in this embodiment) interlocking members 42 are attached to and held by the input transmission ring 4.

The interlocking members 42 are designed to interlock the input transmission ring 4 with the automatic input ring 63, and the input transmission ring 4 with the manual input ring 76. Each of the interlocking members 42 includes a roller shaft 42a and a rotating roller 42b. Each rotating roller 42b is rotatably supported by each corresponding roller shaft 42a.

Each roller shaft 42a supporting each corresponding rotating roller 42b is attached to the input transmission ring 4, so that the rotating roller 42b is placed on the outer circumferential side of the input transmission ring 4, with the axial direction of the rotating roller 42b being perpendicular to the axis of the fixed cylinder 2 (or perpendicular to the optical axis). In this arrangement, the rotating rollers 42b protrude from both the front and rear end surfaces in the axial direction of the input transmission ring 4. The three interlocking members 42 attached to the input transmission ring 4 in the above described manner are arranged at regular intervals in the circumferential direction of the input transmission ring 4.

The input transmission ring 4 having the above described structure is placed between the automatic input ring 63 and the manual input ring 76 in the axial direction of the fixed cylinder 2 (the optical axis direction) and is located on the outer circumferential side of the fixed cylinder 2 and the lens drive cylinder 5, so that the input transmission ring 4 can rotate around the axis of the fixed cylinder 2 (or the optical axis) with respect to the fixed cylinder 2.

In this arrangement, the rotating rollers 42b are placed between the second roller rotating portion 63d of the automatic input ring 63 and the first roller rotating portion 76a of the manual input ring 76, and are sandwiched by these two components in a pressurized state created by the pushing member 11.

Specifically, the pushing member 11 formed with a corrugated ring-like spring is provided between the input ring holding portion 77a of the manual operation ring 77 and the manual input ring 76, and the manual input ring 76 is pushed toward the automatic input ring 63 on the front side by the pushing member 11.

With the pushing force, the first roller rotating portion 76a of the manual input ring 76 presses the rotating rollers 42b, and, with the pressing force, the rotating rollers 42b are pressed against the second roller rotating portion 63d of the automatic input ring 63.

As a result, the rotating rollers 42b are sandwiched by the second roller rotating portion 63d and the first roller rotating portion 76a, with a certain amount of pushing force being applied thereto. The automatic input ring 63 pressed by the rotating rollers 42b remain supported by the bearings 24.

Figure 5:
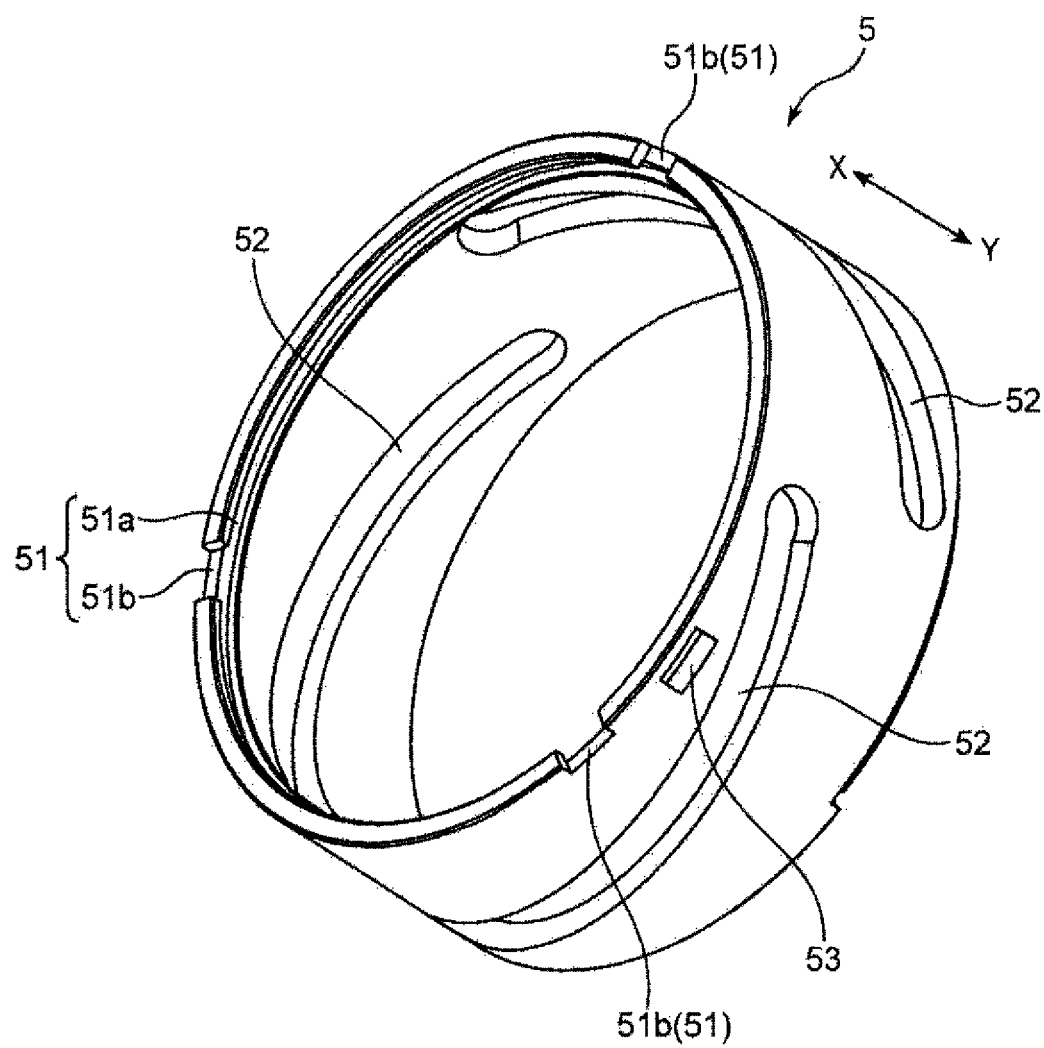
FIG. 5 is a perspective view of the lens drive cylinder used in the lens barrel of FIG. 1.

Next, the lens drive cylinder 5 is described. The lens drive cylinder 5 includes three bayonet engaging portions 51 and three cam grooves 52, as shown in FIGS. 3 and 5. With the bayonet engaging portions 51, the lens drive cylinder 5 is engaged with the fixed cylinder 2 in such a manner that the lens drive cylinder 5 is able to rotate around the axis of the fixed cylinder 2 (the optical axis) but is unable to move in the axial direction.

In this embodiment, the bayonet engaging portions 51 are formed in three positions in the circumferential direction on the front side of the lens drive cylinder 5. Each of the bayonet engaging portions 51 includes an engaging groove 51a with which the bayonet engaging convex portion 23 of the fixed cylinder 2 is to be slidably engaged, and a groove inlet 51b through which the bayonet engaging convex portion 23 is to be engaged with the engaging groove 51a.

Each engaging groove 51a is formed in the inner circumferential surface of the lens drive cylinder 5, and has a predetermined length in the circumferential direction. Each groove inlet 51b has a predetermined depth from the front end surface of the lens drive cylinder 5, and is formed to connect to one end of each corresponding engaging groove 51a.

The cam grooves 52 are designed to drive the lens groups 31 and 32 in the axial direction of the fixed cylinder 2 when the lens drive cylinder 5 rotates, and are arranged at regular intervals in the circumferential direction. Each cam groove 52 is formed with an elongate hole that has a predetermined length and are at predetermined angles with respect to the axial direction and the circumferential direction.

The lens drive cylinder 5 also has two ring engaging convex portions (engaging convex portions) 53 in positions corresponding to the lens drive cylinder engaging concave portions 44 in the outer circumferential surface on the front side of the lens drive cylinder 5. The two ring engaging convex portions 53 are to be engaged with the lens drive cylinder engaging concave portions 44 in a non-rotatable manner. Each of the ring engaging convex portions 53 has the same width as the width of each lens drive cylinder engaging concave portion 44 in the circumferential direction, and is inserted into and engaged with each corresponding lens drive cylinder engaging concave portion 44 so as to be unable to move in the circumferential direction but be able to move in the axial direction.

In this embodiment, the ring engaging convex portions 53 are integrally formed with the lens drive cylinder 5 and protrude from the outer circumference of the lens drive cylinder 5. However, the ring engaging convex portions 53 are not limited to this embodiment, and may be formed with engaging pins that are independent of the lens drive cylinder 5 and are attached to the lens drive cylinder 5.

The lens drive cylinder 5 is rotatably inserted into the outer circumferential side on the rear side of the fixed cylinder 2 as shown in FIG. 1, and the bayonet engaging convex portion 23 of the fixed cylinder 2 is slidably inserted to the engaging grooves 51a. In this arrangement, the lens drive cylinder 5 is placed between the fixed cylinder 2 and the input transmission ring 4 in the radial direction, and the ring engaging convex portions 53 of the lens drive cylinder 5 are inserted into and engaged with the lens drive cylinder engaging concave portions 44.

Next, the lens holding member 7 is described. In this embodiment, the lens holding member 7 includes a lens holding member main body 71, sliding shafts 75 attached to the lens holding member main body 71, a first lens group holding frame 72 connected to the front side of the lens holding member main body 71, and a second lens group holding frame 73 connected to the rear side of the lens holding member main body 71, as shown in FIG. 1.

The lens holding member main body 71 has a cylindrical form, has a first holding frame connecting screw portion 71a connected to the first lens group holding frame 72 in the inner circumference on the front end side, and has a second holding frame connecting screw portion 71b connected to the second lens group holding frame 73 in the inner circumference on the rear end side.

The lens holding member main body 71 also has, on its rear side, sliding shaft attaching female screw portions 71c to which the sliding shafts 75 are attached. Three sliding shaft attaching female screw portions 71c are formed at regular intervals in the circumferential direction of the lens holding member main body 71 (though only one is shown in FIG. 1).

The sliding shafts 75 are formed with three sliding shafts that are attached to the respective sliding shaft attaching female screw portions 71c and have the same structures.

Each of the sliding shafts 75 has a male screw portion 75a on its one end in the axial direction, a cam groove sliding portion 72c on the other end, and a guide groove sliding portion 75d between the cam groove sliding portion 72c and the male screw portion 75a. The male screw portion 75a is to be screwed into the corresponding sliding shaft attaching female screw portion 71c, the cam groove sliding portion 72c slides in the corresponding cam groove 52 of the lens drive cylinder 5, and the guide groove sliding portion 75d slides in the straight guide groove 22 of the fixed cylinder 2.

The first lens group holding frame 72 has a cylindrical form, and has, on its inner circumferential side, a lens holding portion 72b that holds the later described first lens group 31. The first lens group holding frame 72 also has a main body connecting male screw portion 72a at a rear portion on its outer circumferential side.

The main body connecting male screw portion 72a is screwed into the first holding frame connecting screw portion 71a of the lens holding member main body 71, so that the first lens group holding frame 72 is connected to the front side of the lens holding member main body 71.

The second lens group holding frame 73 has a cylindrical form, and has, on its inner circumferential side, a lens holding portion 73a that holds the later described second lens group 32. The second lens group holding frame 73 also has a main body connecting male screw portion 73b on its outer circumferential side.

The main body connecting male screw portion 73b is screwed into the second holding frame connecting screw portion 71b of the lens holding member main body 71, so that the second lens group holding frame 73 is connected to the rear side of the lens holding member main body 71.

The shape, the number, and the like of the lens holding member(s) 7 are not particularly limited, and may be changed as appropriate. For example, more than one lens holding member may be provided, and the corresponding number of cam grooves and the corresponding number of straight guide grooves may also be provided.

Next, the lens groups 31 and 32 are described. In this embodiment, the lens groups include the first lens group 31 held by the lens holding portion 72b of the first lens group holding frame 72, and the second lens group 32 held by the lens holding portion 73a of the second lens group holding frame 73. Each of the first and second lens groups 31 and 32 is formed with one or more lenses.

In this embodiment, the second lens group 32 includes a lens protruding portion 33 that has its rear side (one end side) protruding backward from the rear end of the second lens group holding frame 73. Light shielding members 9 are attached to the rear end of the lens protruding portion 33.

The lens barrel 1 having the above described structure is operated by turning on an automatic focus switch (not shown), for example. With that, power is supplied to the motor 61 under the control of the control unit 62, and the output gear 61c rotates accordingly.

As the output gear 61c rotates, the automatic input ring 63 meshed with the output gear 61c rotates. With this rotation, the rotating roller 42b rotates the second roller rotating portion 63d. At this point, the rotating roller 42b is sandwiched by the second roller rotating portion 63d and the first roller rotating portion 76a of the manual input ring 76, and the manual input ring 76 is restrained from rotating by the pushing force of the pushing member 11 or the like. Accordingly, the rotating roller 42b revolves around the fixed cylinder 2 while rotating, so that the input transmission ring 4 holding the rotating roller 42b rotates.

As the input transmission ring 4 rotates, the lens drive cylinder 5 engaged in a non-rotatable manner by the ring engaging convex portions 53 and the lens drive cylinder engaging concave portions 44 rotates.

As the lens drive cylinder 5 rotates, the sliding shafts 75 inserted in the respective straight guide grooves 22 of the fixed cylinder 2 and the respective cam grooves 52 of the lens drive cylinder 5 slide in those grooves 22 and 52. As the sliding shafts 75 slide, the lens holding member 7 moves in the axial direction of the fixed cylinder 2, and the lens groups 31 and 32 held by the lens holding member 7 also move in the axial direction of the fixed cylinder 2.

In this situation, the manual operation ring 77 is rotated by hand. As a result, the manual input ring 76 rotates, and the rotating roller 42b rotates the first roller rotating portion 76a. At this point, the automatic input ring 63 holding the rotating roller 42b with the first roller rotating portion 76a is unable to rotate, being meshed with the motor 61. Therefore, the rotating roller 42b revolves around the fixed cylinder 2 while rotating, and the entire input transmission ring 4 rotates. After that, the lens drive cylinder 5 rotates in the same manner as above. As the lens drive cylinder 5 rotates, the sliding shafts 75 inserted in the respective straight guide grooves 22 of the fixed cylinder 2 and the respective cam grooves 52 of the lens drive cylinder 5 slide in those grooves 22 and 52. As the sliding shafts 75 slide, the lens holding member 7 moves in the axial direction of the fixed cylinder 2, and the lens groups 31 and 32 held by the lens holding member 7 also move in the axial direction of the fixed cylinder 2.

Having the above described structure, the input transmission ring is placed on one side of the motor in the optical axis direction, the one side being the same side as the lens drive cylinder with respect to the motor. Accordingly, the lens drive cylinder and the input transmission ring can be connected in such a manner that rotating force can be transmitted, without the use of a connecting lever that has been used in conventional structures.

In addition, as the input transmission ring and the lens drive cylinder are placed on one side in the optical axis direction with respect to an electric component, the input transmission ring and the lens drive cylinder can be connected, without interfering with the electric component.

As part or all of the motor is placed on the circumferential-direction side of the electric component, the length of the lens barrel in the optical axis direction can be reduced, and the lens barrel can be made smaller in size.

The lens drive cylinder is placed on the outer circumferential side of the fixed cylinder in a rotatable manner with respect to the fixed cylinder, and part or all of the input transmission ring is placed on the outer circumferential side of the lens drive cylinder. Accordingly, the length of the lens barrel in the radial direction can be reduced, and the lens barrel can be made smaller in size.

The lens drive cylinder includes the ring engaging convex portions, and the input transmission ring includes the lens drive cylinder engaging concave portions to be engaged with the ring engaging convex portions in such a manner as to be unable to move in the circumferential direction. Accordingly, the input transmission ring and the lens drive cylinder are certainly connected by the engaging convex portions and the engaging concave portions in such a manner that rotating force can be transmitted. In addition, the input transmission ring and the lens drive cylinder can be readily connected in such a manner that rotating force can be transmitted.

Furthermore, the input transmission ring and the lens drive cylinder are engaged with each other in such a manner as to be able to move in the optical axis direction. Accordingly, the position of the input transmission ring in the optical axis direction can be determined without any restriction in the optical axis direction from the lens drive cylinder that has its optical axis position determined by a bayonet portion, and the input transmission ring can operate without decrease in input transmission efficiency. Specifically, as the force of the corrugated washer 11 is stabilized, the automatic input ring can be in contact with a roller, without any load being applied thereto.

Figure 8:
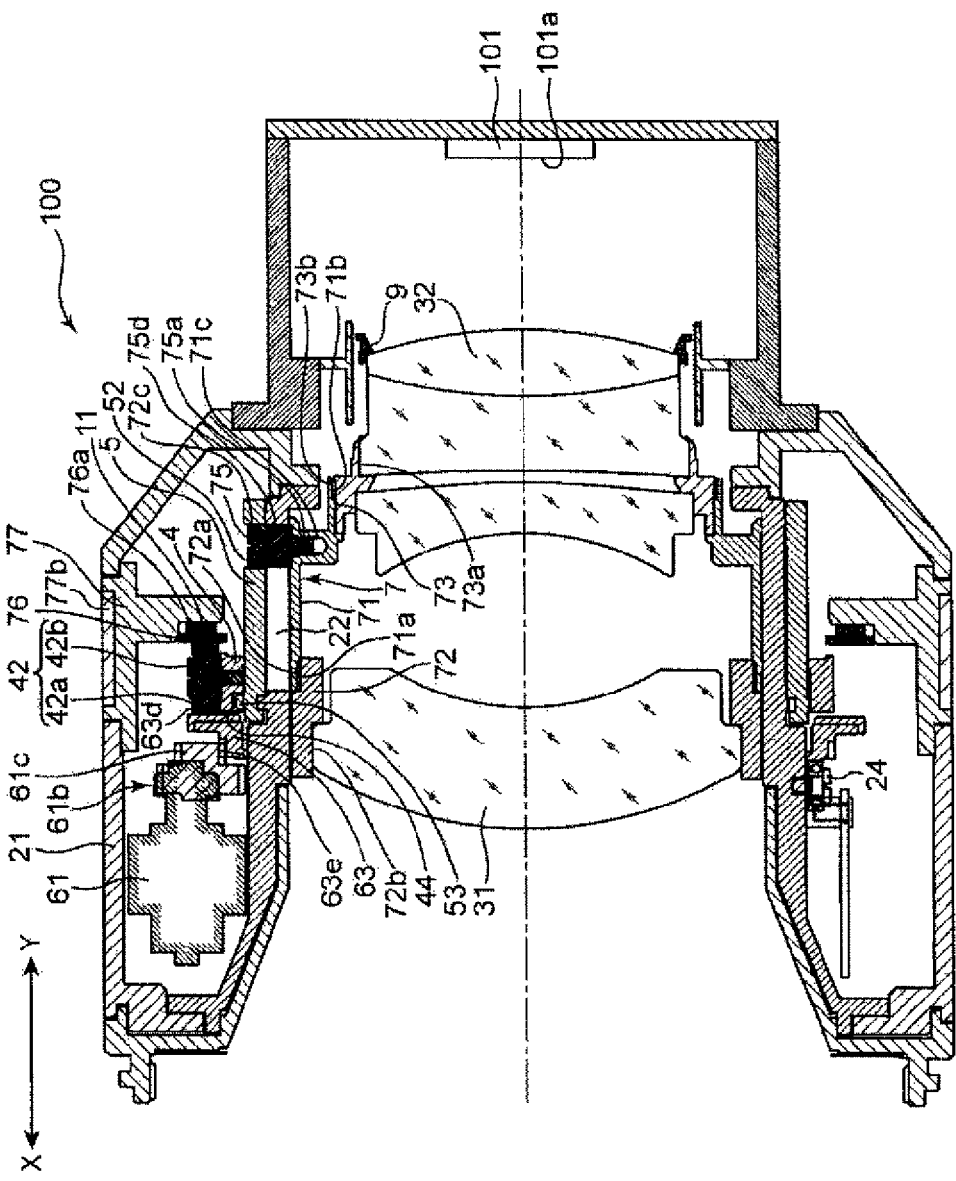
FIG. 8 is a cross-sectional view of an example of a lens unit including a lens barrel according to an embodiment of the present invention.

Next, a lens unit 100 is described. As shown in FIG. 8, the lens unit 100 includes the lens barrel 1 and an imaging device 101. The lens barrel 1 has the same structure as the one described above.

The imaging device 101 is a device that photoelectrically converts the respective components of R (red), G (green), and B (blue) into image signals in accordance with the amounts of light in an optical image of an object imaged by an imaging optical system (only partially shown), and outputs the image signals to a predetermined image processing circuit (not shown). The imaging device 101 is a CCD image sensor or a CMOS image sensor, for example.

The imaging device 101 is placed on the rear side of the second lens group 32 so that the light receiving surface 101a of the imaging device 101 is located in the imaging position of the lens barrel 1.

In the above described embodiment, the engaging concave portions (the lens drive cylinder engaging concave portions 44) that engage the input transmission ring 4 the lens drive cylinder 5 are formed in the input transmission ring 4, and the engaging convex portions (the ring engaging convex portions 53) are formed on the lens drive cylinder 5. However, the present invention is not limited to that arrangement, and a modification may be made as appropriate. For example, the engaging convex portions may be formed on the input transmission ring 4, and the engaging concave portions may be formed in the lens drive cylinder 5.

Although the lens drive cylinder 5 is formed on the outer circumferential side of the fixed cylinder 2 in the above described embodiment, the present invention is not limited to that arrangement, and a modification may be made as appropriate. For example, the lens drive cylinder 5 may be formed on the inner circumferential side of the fixed cylinder 2.

In a case where the lens drive cylinder 5 is formed on the inner circumferential side of the fixed cylinder 2, the engaging concave portions and the engaging convex portions may be designed as described below, for example.

Figure 7:
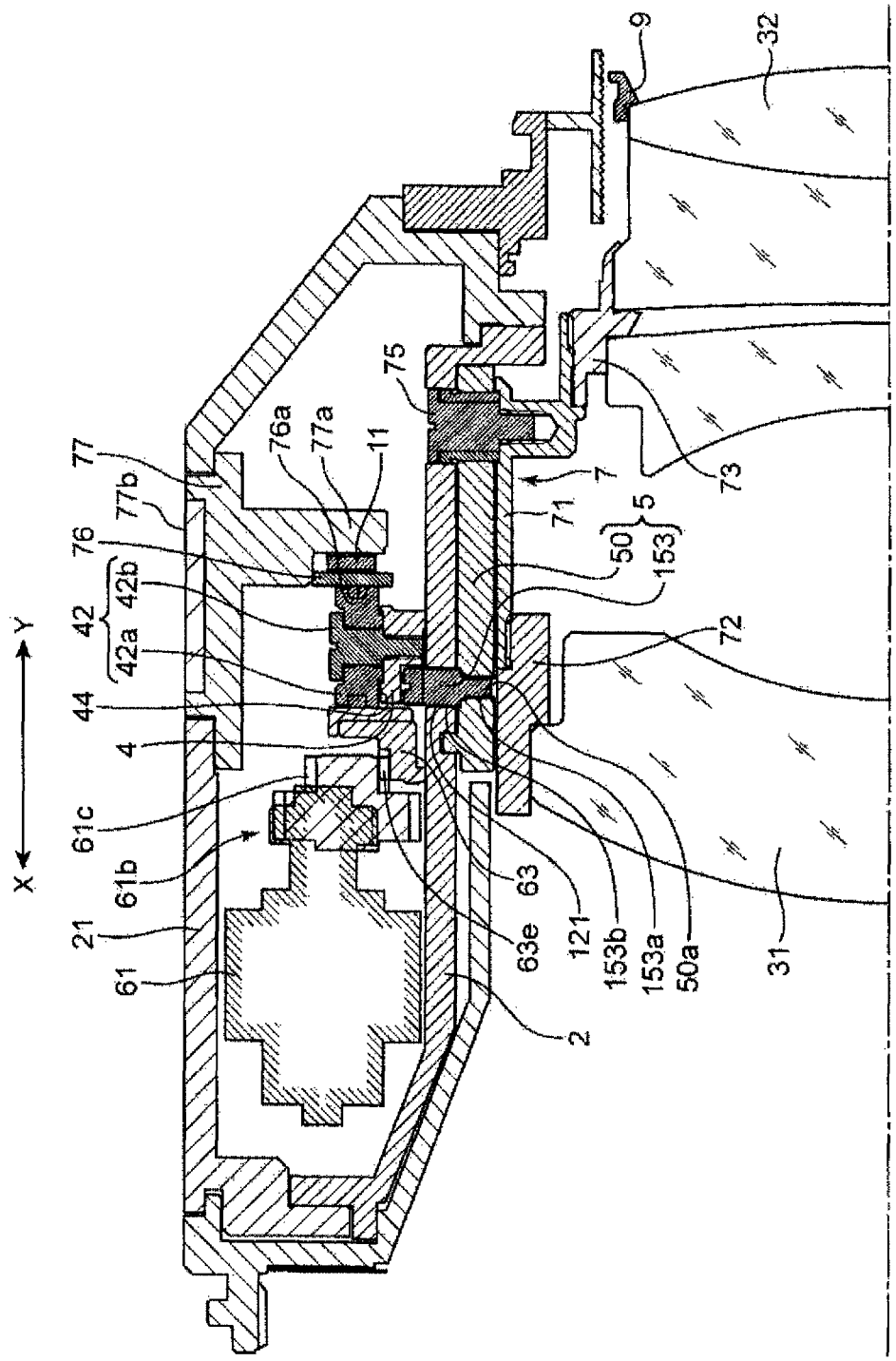
FIG. 7 is a cross-sectional view of a lens barrel according to another embodiment.

As shown in FIG. 7, the lens drive cylinder 5 includes a lens drive cylinder main body 50 and an engaging convex portion 153 independent of the lens drive cylinder main body 50. The engaging convex portion 153 has a column-like form, and has a male screw portion 153a at one end and an engaging portion 153b at the other end. The engaging portion 153b is engaged with the input transmission ring 4.

The male screw portion 153a is connected to a female screw portion 50a formed in the lens drive cylinder main body 50, so that the engaging portion 153b protrudes outward from the outer circumference of the lens drive cylinder main body 50 in the radial direction.

When the lens drive cylinder 5 is formed on the inner circumferential side of the fixed cylinder 2, the engaging portion 153b penetrates through a sliding groove 121 formed in the fixed cylinder 2. The sliding groove 121 has such a width that the engaging portion 153b can penetrate through and move in the sliding groove 121, and has a predetermined length (not shown) in the circumferential direction of the fixed cylinder 2. In this structure, the sliding groove 121 is not in contact with the engaging portion 153b, but some space is left between them.

The bayonet connection between the lens drive cylinder and the fixed cylinder may be removed, and the engaging portion 153b and the sliding groove 121 may be engaged with each other. In such a case, it is preferable to evenly prepare two or more engaging convex portions 153 and two or more concave portions 44.

The lens drive cylinder engaging concave portions 44 as the engaging concave portions of the input transmission ring 4 are designed so that the engaging portions 153b of the engaging convex portions 153 can be inserted thereinto and engaged therewith in such a manner as to be unable to move in the circumferential direction.

The tips of the engaging portions 153b penetrating through the sliding groove 121 are inserted into and engaged with the lens drive cylinder engaging concave portions 44.

With this, the lens drive cylinder 5 is rotatably placed on the inner circumferential side of the fixed cylinder 2, and is connected to the input transmission ring 4 in such a manner that rotating force can be transmitted.

In this case, the engaging concave portions may also be formed in the lens drive cylinder 5, and the engaging convex portions may also be formed on the input transmission ring 4.

Although the straight guide grooves 22 are formed in the fixed cylinder 2 while the cam grooves 52 are formed in the lens drive cylinder 5 in the above described embodiment, the present invention is not limited to that, and a modification may be made as appropriate. For example, the cam grooves 52 may be formed in the fixed cylinder 2, and the straight guide grooves 22 may be formed in the lens drive cylinder 5.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A lens barrel comprising:
a motor;
an input transmission ring rotated by the motor, the input transmission ring being rotatable around an optical axis; and
a lens drive cylinder connected to the input transmission ring so that rotating force is transmitted from the input transmission ring, the lens drive cylinder moving a lens in an optical axis direction and being rotatable;
an automatic input ring rotated by the motor, the automatic input ring being rotatable around the optical axis; and
at least three interlocking members that interlock the input transmission ring with the automatic input ring, wherein
the lens drive cylinder is placed on one side of the motor in the optical axis direction,
the input transmission ring is placed on the same side of the motor as the lens drive cylinder,
each of the interlocking members includes a roller shaft held by the input transmission ring, and a rotating roller rotatably supported by the roller shaft,
the rotating roller rotates the automatic input ring as the automatic input ring rotates, and
the input transmission ring rotates around the optical axis as the rotating roller rotates.

2. The lens barrel according to claim 1, further comprising:
an electric component that controls the motor, wherein
the input transmission ring and the lens drive cylinder are placed on one side of the electric component in the optical axis direction, and
part or all of the motor is placed on a circumferential-direction side of the electric component.

3. A lens unit comprising:
the lens barrel according to claim 2; and
an imaging device that converts an optical image of an object into an electrical signal, the imaging device having a light receiving surface in an imaging position of the lens barrel.

4. A lens unit comprising:
the lens barrel according to claim 1; and
an imaging device that converts an optical image of an object into an electrical signal, the imaging device having a light receiving surface in an imaging position of the lens barrel.

5. A lens barrel comprising:
a fixed cylinder;
a motor;
an input transmission ring rotated by the motor, the input transmission ring being rotatable around an optical axis; and
a lens drive cylinder connected to the input transmission ring so that rotating force is transmitted from the input transmission ring, the lens drive cylinder moving a lens in an optical axis direction and being rotatable, wherein
the lens drive cylinder is placed on one side of the motor in the optical axis direction,
the input transmission ring is placed on the same side of the motor as the lens drive cylinder,
the lens drive cylinder is placed on one of an outer circumferential side and an inner circumferential side of the fixed cylinder, and
part or all of the input transmission ring is placed on an outer circumferential side of the lens drive cylinder.

6. A lens unit comprising:
the lens barrel according to claim 5; and
an imaging device that converts an optical image of an object into an electrical signal, the imaging device having a light receiving surface in an imaging position of the lens barrel.

7. A lens barrel comprising:
a motor;
an input transmission ring rotated by the motor, the input transmission ring being rotatable around an optical axis; and
a lens drive cylinder connected to the input transmission ring so that rotating force is transmitted from the input transmission ring, the lens drive cylinder moving a lens in an optical axis direction and being rotatable, wherein
the lens drive cylinder is placed on one side of the motor in the optical axis direction,
the input transmission ring is placed on the same side of the motor as the lens drive cylinder,
one of the lens drive cylinder and the input transmission ring has at least one engaging convex portion, and
the other one of the lens drive cylinder and the input transmission ring has at least one engaging concave portion engaged with the at least one engaging convex portion so as to be unable to move in a circumferential direction.

8. The lens barrel according to claim 7, wherein
the at least one engaging convex portion includes two engaging convex portions arranged at substantially regular intervals in the circumferential direction of the one of the lens drive cylinder and the input transmission ring, and the at least one engaging concave portion includes two engaging concave portions placed in positions corresponding to the engaging convex portions in the other one of the lens drive cylinder and the input transmission ring.

9. The lens barrel according to claim 7, wherein the at least one engaging convex portion and the at least one engaging concave portion are engaged with each other in such a manner as to be able to move in the optical axis direction.

10. A lens unit comprising:
   the lens barrel according to claim 7; and
   an imaging device that converts an optical image of an object into an electrical signal, the imaging device having a light receiving surface in an imaging position of the lens barrel.

* * * * *